United States Patent [19]
Shaw

[11] 3,741,040
[45] June 26, 1973

[54] HYDROSTATIC-MECHANICAL TRANSMISSION

[76] Inventor: Noel S. Shaw, 7158 S. Vernon Avenue, Chicago, Ill. 60619

[22] Filed: Apr. 10, 1972

[21] Appl. No.: 242,578

[52] U.S. Cl. .................................. 74/794, 192/61
[51] Int. Cl. ........................ F16h 5/18, F16d 31/04
[58] Field of Search ...................... 74/794; 192/61

[56] References Cited
UNITED STATES PATENTS

| | | | |
|---|---|---|---|
| 1,765,948 | 6/1930 | Sheridan | 74/794 |
| 1,839,027 | 12/1931 | Halford et al. | 74/794 UX |
| 1,974,354 | 9/1934 | Cole | 74/794 |
| 2,454,694 | 11/1948 | Grebb | 74/794 |
| 2,488,408 | 11/1949 | Hollmann et al. | 74/794 |
| 2,590,305 | 3/1952 | Foster | 74/794 |

FOREIGN PATENTS OR APPLICATIONS 1,134,929   6/1957   France ................................ 74/794

Primary Examiner—Arthur T. McKeon
Attorney—Robert C. Brown, Jr. et al.

[57] ABSTRACT

A hydrostatic-mechanical transmission arrangement comprising a casing rotatably mounting a gear carrier and sun gears journaled on either side of same for rotation about the axis of rotation of the carrier, with the carrier carrying a gear pump of which one of the meshing gears thereof is coupled to one of the sun gears, and the other pump gear is coupled to the other sun gear, and with the carrier equipped with a hydraulic motor of the axial piston type including an annular reaction plate against which the motor pistons react that is non-rotating in nature, but adjustable about a pivot axis normal to the axis of rotation of the carrier. A hydraulic conduit arrangement including a flow orienting valve plate fixed to the casing but in liquid tight relation with the carrier confines hydraulic liquid flow to between the pump and motor. Either of the sun gears may serve as the input, but by reversing the functions of the motor and pump, the carrier may be driven to serve as the input.

10 Claims, 9 Drawing Figures

3,741,040

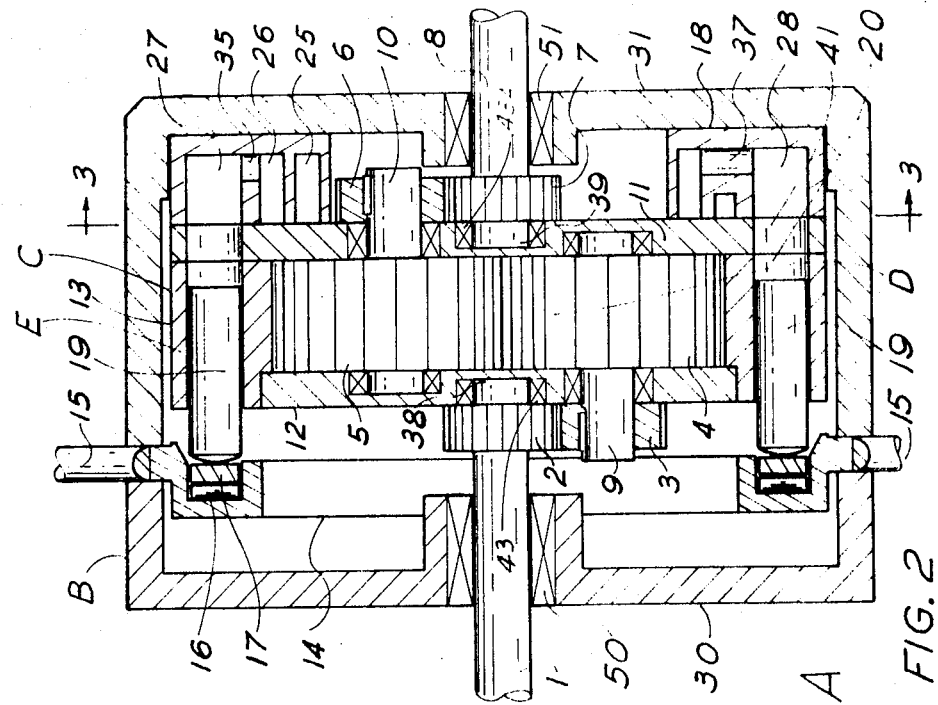
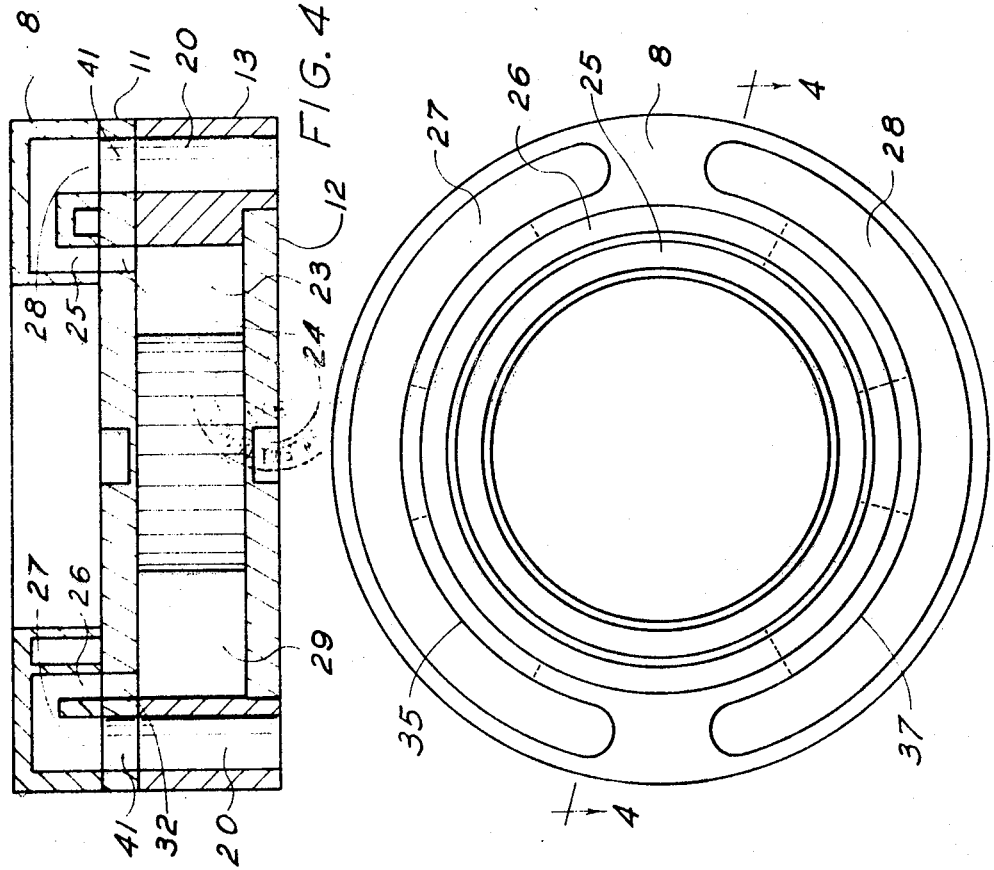

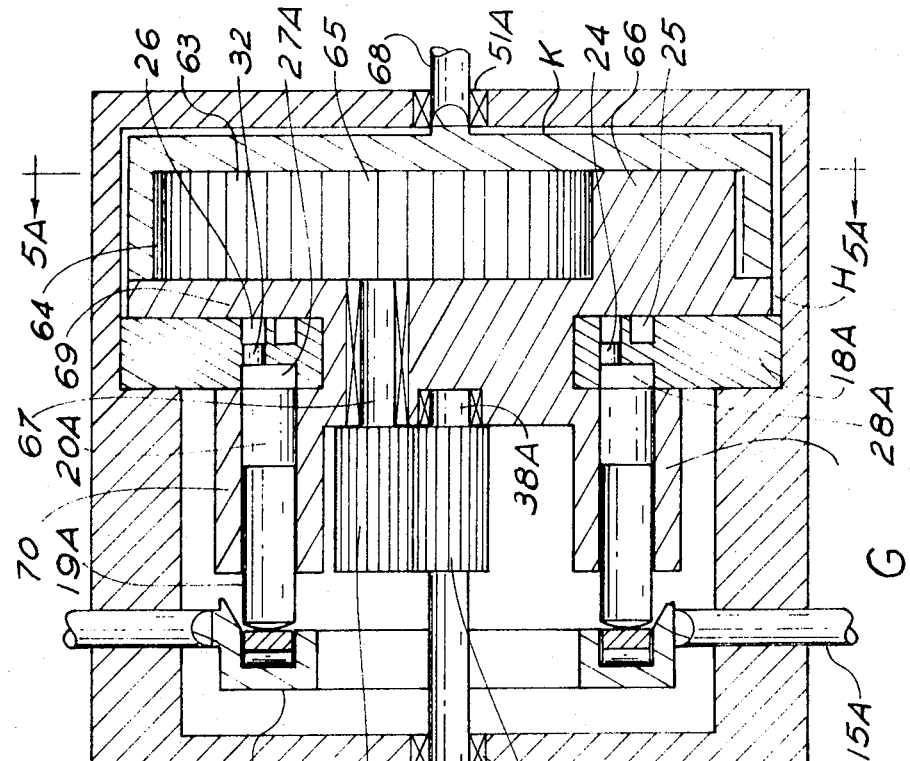
FIG. 5
FIG. 5A
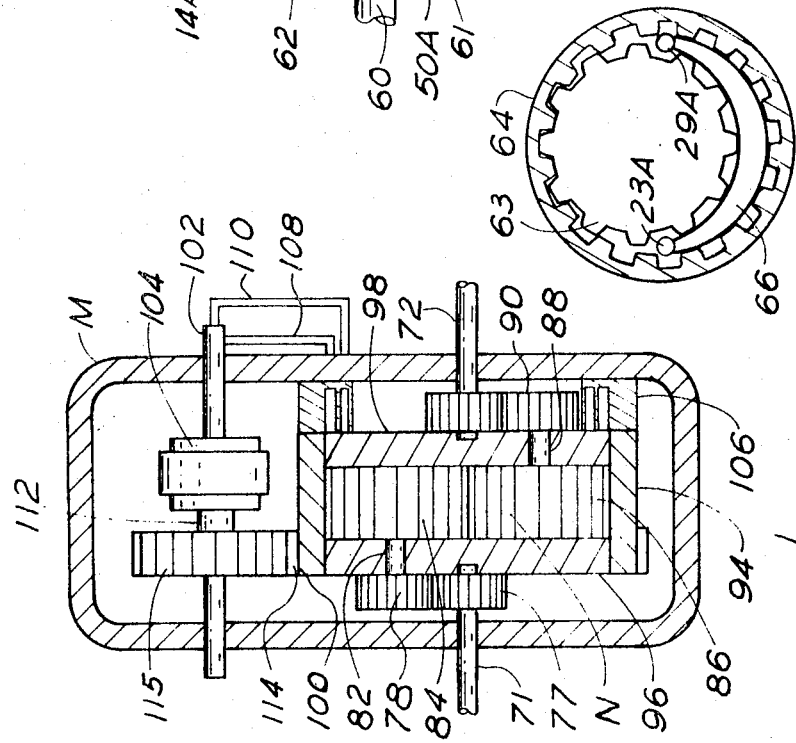
FIG. 6

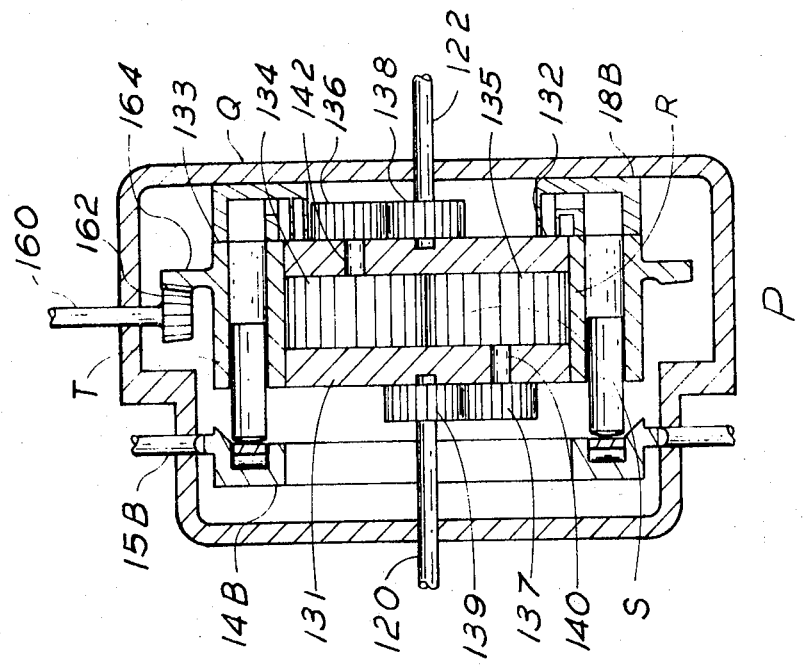
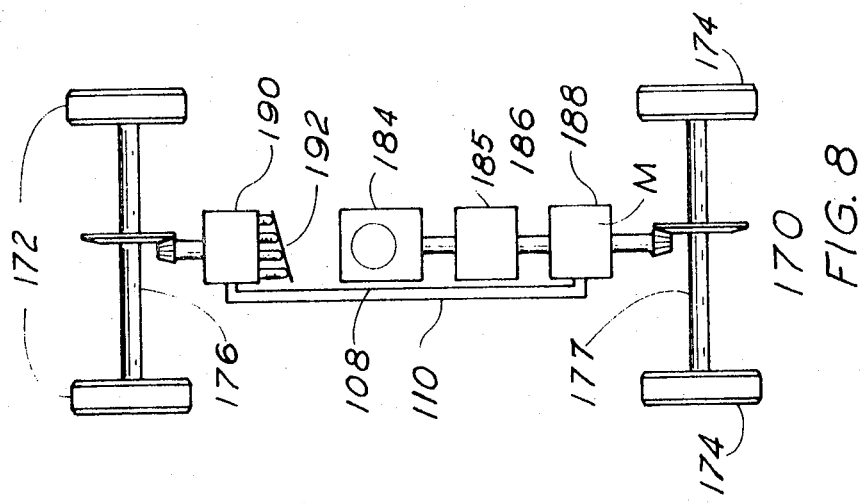

HYDROSTATIC-MECHANICAL TRANSMISSION

This invention relates to a hydrostatic-mechanical transmission, and more particularly, to a transmission having both hydraulic and mechanical power paths to provide a transmission having infinite ratio selection over its range that includes a zero speed and reverse speed ratios.

In situations where the load is to vary continuously with time, and the power source is essentially a constant speed device, an infinite ratio transmission is needed to provide optimum match between the power source and the load at all times. Conventionally, friction, hydrokinetic, and hydrostatic transmissions are three of the most commonly used infinite ratio transmissions. However, such devices are less efficient, of greater weight, and are more expensive, than their all gear counterparts.

Another infinite ratio transmission in limited use is the shunt type transmission, which provides higher efficiency and greater power capacity for a given transmission weight than those just mentioned. In such devices, one or more differentials are used to parallel or "shunt" an infinite ratio transmission with a gear type transmission. However, one basic problem with transmissions of the shunt type is that they are very complex and thus overly expensive. Also, they have lower power capacity at lower rpm in some types of hydrostatic and shunt arrangements, and the elimination of the various types of clutches, valves, hydraulic lines and the like that are conventionally found in such devices would be advantageous.

The principal object of this invention is to provide an infinite ratio transmission that includes a gear differential mechanical power path and a hydrostatic power and ratio control path, and avoids the complexities and expense of manufacture of conventional infinite ratio transmissions while retaining their advantages.

Another principal object of the invention is to provide a basic transmission arrangement that may be used as a drive transmission, as a steering differential, and as a four wheel drive transmission.

Other objects of the invention are to provide a transmission that greatly simplifies infinite ratio transmissions, and that is economical of manufacture, convenient to install and use, and long lived in operation.

In accordance with this invention there is provided a hydrostatic-mechanical transmission that has a gear differential mechanical power path and a hydrostatic, gear pump to piston motor, power and ratio control path. The mechanical power path has a planetary differential gear train interconnecting coaxial input and output shafts, a rotatably mounted gear carrier that rotates about the axis of said shafts carrying the planetary gears. Two gears of the differential gear train that are journaled in the gear carrier are also arranged as a hydraulic gear pump and are common to both the mechanical and hydrostatic power paths the latter also including a hydraulic motor of the variable displacement type. The mechanical power path is from the input shaft through the gear pump gears to the output shaft, while the hydrostatic power path is from the gear pump through a hydraulic circuit to the variable displacement hydraulic motor, which drives the carrier, with the hydrostatic power path being recombined with the mechanical power path for application to the output of the transmission. The hydraulic motor in a preferred form includes a non-rotating reaction plate that is variable in position to control the hydraulic motor displacement and thus the transmission ratio.

Other objects, uses, and advantages will be obvious or will become apparent from a consideration of the following detailed description and the application drawings.

In the drawings:

FIG. 2 is a section substantially along line 2—2 of FIG. 1, with parts being shown in elevation and other parts shown in diagram form;

FIG. 3 is a side view of a valve plate arrangement employed in the embodiments of FIGS. 1 and 2, viewed as indicated by section line 3—3 of FIG. 2;

FIG. 4 is a sectional view of the valve plate shown in FIG. 3, taken substantially along line 4—4 of FIG. 3, showing same in association with the hydraulic pump and motor that it cooperates with;

FIG. 5 is a view similar to that of FIG. 2 but illustrating a modified form of the invention;

FIG. 5A is a small scale diagrammatic view of the pump gears of the embodiment of FIG. 5 taken along line 5A—5A of FIG. 5;

FIG. 6 is a view similar to that of FIGS. 2 and 5, but illustrating a further modified form of the invention;

FIG. 7 is a view similar to that of FIGS. 2, 5 and 6 showing an embodiment of this invention arranged as a steering differential; and FIG. 8 is a schematic diagram illustrating another embodiment of the invention in which the transmission is arranged as a four wheel drive for a vehicle.

Figure 1:
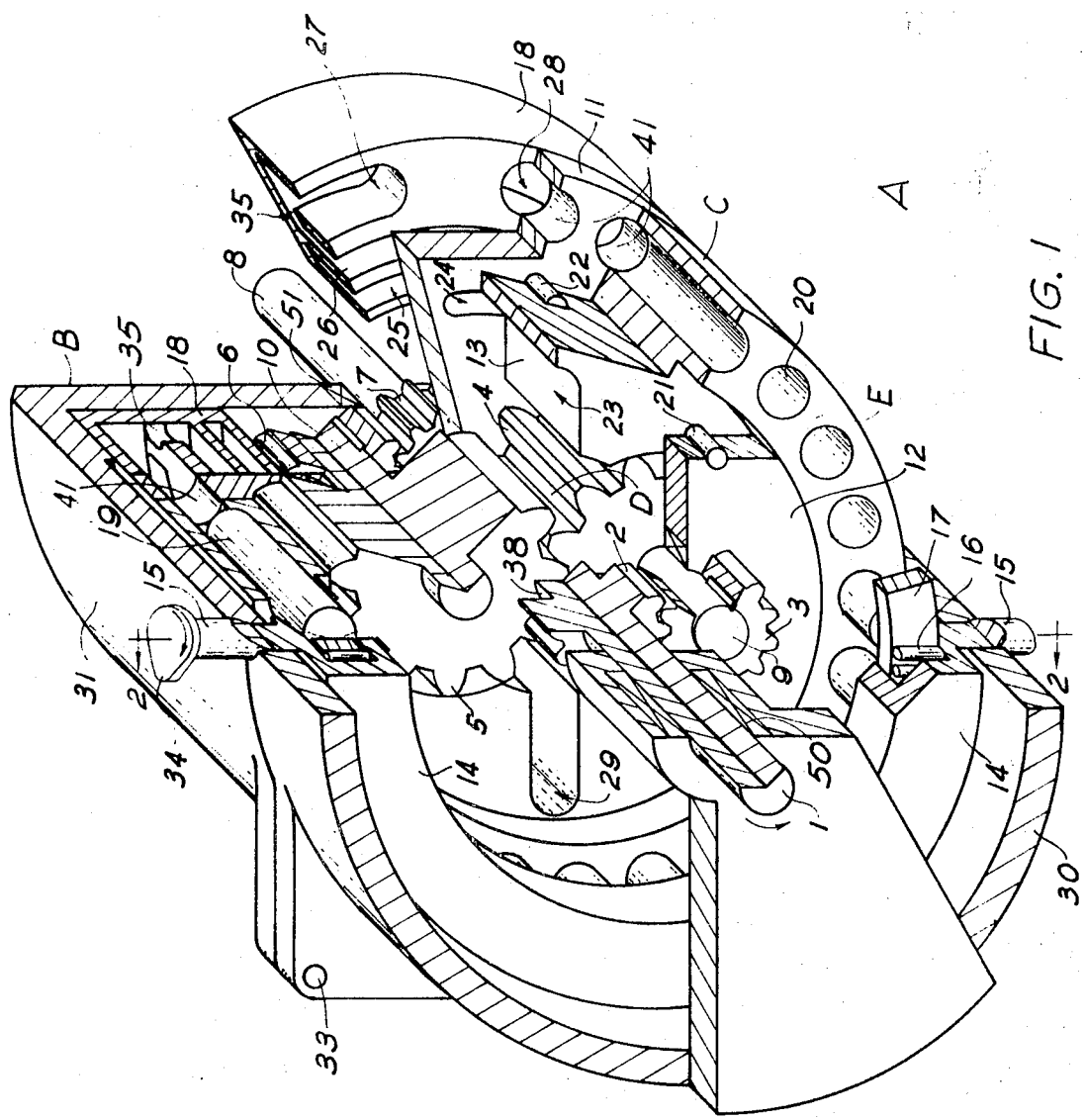
FIG. 1 is a diagrammatic broken away perspective view of a preferred embodiment of the invention.

However, it is to be understood that the specific drawing illustrations provided are supplied primarily to comply with the Patent Laws, and that the invention may have other embodiments that will be obvious to those skilled in the art and that are intended to be covered by the appended claims.

Reference character A of FIGS. 1 and 2 generally indicates a preferred embodiment of the invention, which comprises a suitable casing B, in the form of casing sections 30 and 31 secured together by suitable bolts (not shown) applied to holes 33 and journaling input shaft 1 and output shaft 8 in opposed coaxially related relation. Journaled on the opposed ends 38 and 39 of input shafts 1 and 8 is a gear carrier C comprising cover plates 11 and 12 and annulus 13 secured together by suitable screws or the like 21 and 22 (shown diagrammatically) and housing gear pump gears 4 and 5 which are suitably keyed to the respective shafts 9 and 10 suitably journaled in the respective cover plates 11 and 12. The shaft 9 has keyed thereto input planet gear 3 that meshes with sun gear 2 that is keyed to shaft 1, while shaft 10 has keyed thereto output planet gear 6 which meshes with output sun gear 7 that is keyed to shaft 8. Pump gears 4 and 5 form a hydraulic pump D for supplying hydraulic liquid to hydraulic motor E that is operably and integrally associated with the gear carrier annulus 13 and comprises a plurality of pistons 19 respectively reciprocably mounted in cylinders 20 formed in circumambient relation about the gear pump D in annulus 13. The pistons 19 act against annular reaction plate 14 that is of the swash plate type, except that it does not rotate, and is journaled at its stub shaft portions 15 for pivotal movement about an axis that is perpendicular to the axis of the shafts 1 and 8, which is also the axis about which the carrier C rotates.

In the form shown, the pistons 19 bear against an annular disc 17 riding on roller bearings received in the endless roller-way 36 that is formed in plate 14. As is conventional, rollers 16 are applied to a suitable retainer (not shown) under the disc 17 that spaces them apart and keeps them properly aligned with the roller way.

Suitably fixed to the casing section 31 is a hydraulic liquid distribution or valve plate 18, which orients the flow of hydrauilc oil contained in the pump and motor and passages interconnecting same to achieve the objects of the invention. A suitable sealing arrangement of a conventional type may be employed (not shown) to effect sealing off of the hydraulic liquid against leakage.

Assuming that the shaft 1 is rotating in the direction indicated by the arrow of FIG. 1, oil on the high pressure side of the pump gears passes through outlet port 29 to annular groove 26 formed in the valve plate 18 through port 32 formed in carrier cover plate 11. Groove 26 communicates with a semi-annular motor feed groove 27 through passages 35 of the plate 18, and feed groove 27 supplies each cylinder 20 with hydraulic liquid under pressure, through cover plate ports 41, as the carrier moves relative to the feed groove 27. Valve plate 18 also includes the semi-annular return groove 28 that receives the oil from the cylinders 20 on their return stroke, through cover plate ports 41, and communicates with annular return groove 25 of the valve plate through passages 37, with the oil then returning to the gear pump through return port 24 in cover plate 11 to gear pump inlet 23. Rotation of shaft 1 in the opposite direction reverses the flow of hydraulic liquid with which the pump and motor (and passages connecting same) are charged.

The shafts 1 and 8 have their opposed ends 38 and 39 journaled in the respective cover plates 11 and 12 by appropriate bearings 43 and 43A.

When the plane of the reaction plate 14 is perpendicular to the axis of rotation of shafts 1 and 8 (the position of FIGS. 1 and 2), the pistons 19 of motor E do not reciprocate, and thus the motor and pump are hydraulically locked up and the ratio of the transmission is one to one. The carrier C in this condition merely rotates about the axis of shafts 1 and 8 without contributing to or affecting the output of the transmission.

If the reaction plate 14 is pivoted clockwise of FIG. 1 (see the arrow of FIG. 1), which permits the pistons 19 to move outwardly under the hydraulic pressure applied against them from the pump outlet 29, the pump gears 4 and 5 begin to rotate and the carrier C starts to slow in speed, relative to speed of rotation of shaft 1. This increases the transmission ratio, and lowers the output rpm of shaft 8, while increasing torque output. As reaction plate 14 is further pivoted in the same direction, the rpm of shaft 8 will decrease to zero for maximum torque output and then commence to rotate in the reverse direction relative to input with corresponding decreases in torque output.

Pivoting the reaction plate 14 in the opposite direction from its position of FIG. 1 will gradually increase the speed of rotation of output shaft 8 and reduce its torque output, relative to input shaft 1.

Suitable bearings 50 and 51 journal the input shafts 1 and 8 in the housing sections 30 and 31, respectively.

It will thus be seen that in accordance with this invention, the pump D and the motor E are integrated into gear carrier C, and the power flow is from the input shaft 1 and its gear 2 and carrier gear 3, shaft 9 and pump gears 4 and 5, where the power flow splits. Part of the power flow is through shaft 10, gear 6 and gear 7 to the output shaft 8, while the remainder of the power goes by oil pressure to cylinders 20 and their pistons 19, and against reaction plate 14, which applies torque to the carrier C and thence to gear 6 and gear 7, where the power flow is recombined.

The relative angular velocity of the gear carrier C, and therefore the transmission ratio, is a function of the ratio between the displacement of the motor E and pump D.

It will therefore be seen that the transmission A comprises a combination differential and hydraulic gear pump. As the gear pump is part of the differential, it can function as a variable displacement pump with the displacement being controlled by the reaction plate 14. The differential itself allows for easy utilization of the reaction torque generated by operation of the gear pump and hydraulic motor. This use of reaction torque reduces the hydraulic power load by fifty per cent or more, as compared with comparable transmissions.

Where the power input to the transmission is applied to two inputs of the differential in a controlled fashion, then the ratio of the differential can be controlled and the differential behaves as an infinite ratio transmission.

In addition to these advantages, the transmission of this invention, by the nature of its simplicity, is much more economical to make than other known units performing the same tasks. It is to be noted that having the motor E built into the carrier C eliminates gearing and hydraulic lines, and the reaction plate 14 is the only internal control of the transmission, and gives infinite ratio selection from design forward through a zero rpm position to a design reverse. The zero rpm position serves as a clutch position.

Referring now to the embodiment G of FIG. 5, casing H journals input shaft 60 and output shaft 68, with the input shaft 60 having a sun gear 61 keyed thereto which meshes with planet gear 62 keyed to shaft 67 which also has keyed thereto input pump gear 63 that meshes with internal pump gear 64 which is fixed with respect to output shaft 68.

Shaft 67 is journaled in gear carrier I which is mounted for rotation about the axis of the coaxial shafts 60 and 68 and cooperates with valve plate 18A that is similar in nature to valve plate 18 (corresponding references indicate corresponding grooves and ports) for cooperation in suction and pressure ports 23A and 29A formed in wall 69 of carrier I, for orienting hydraulic liquid flow to and from cylinders 20A of the axial piston motor J that is built into the gear carrier I in a manner similar to the transmission A. Thus, the cylinders 20A are formed about a rim portion 70 of the carrier I, and each is equipped with piston 19A operatively associated with a reaction plate 14.

The pump gears 63 and 64 form an internal pump gear 65 of a familiar type (see FIG. 5A) which includes the usual crescent shaped divider 66, which in the form shown may be part of the carrier wall 69. Suitable bearings 50A and 51A journal shafts 60 and 68, respectively, in casing H, and the inner end portion 70 of shaft 60 is journaled in carrier I by suitable bearing 38A.

The transmission G operates in the same manner as transmission A, the main difference being that the differential employs an internal gear pump rather than an external gear pump.

In the embodiment L of FIG. 6, the casing M suitably journals input and output shafts 71 and 72, with the input sun gear 77 meshing with input planet gear 78 keyed to shaft 82 which is also keyed to pump gear 84 that meshes with pump gear 86 that is keyed to shaft 88 which also has keyed to same planet gear 90 which meshes with output sun gear 92 that is keyed to output shaft 72. Shafts 82 and 88 are suitably journaled in gear carrier 94, which in the form disclosed comprises suitable end plates 96 and 98 that are suitably fixed to an annulus 100 that in the form shown does not include hydraulic motor piston and cylinder assemblies.

In the transmission L, the casing M mounts fixed shaft 102 on which is mounted radial piston type hydraulic motor 104 that may be of any suitable design, and that is powered by the gear pump N (formed by pump gears 84 and 86), with the hydraulic liquid being communicated to and from the motor 104 through suitable orienting plate 106 that is fixed with respect to the casing M, and communicates hydraulic liquid between supply and return conduits 108 and 110 (which are connected in any suitable manner to passages (not shown) leading to the operating parts of motor 104).

In the form shown, shaft 102 is suitably fixed with respect to the housing 10, and motor 104 drives sleeve 112 that is journaled on same and as keyed to same suitable drive gear 115 which meshes with casing gear 114.

The specific manner of communicating the hydraulic oil between pump N and motor 104 may be of any suitable type, the embodiment of FIG. 6 being provided to show that the hydraulic motor of the differential need not be integrated with the gear pump carrier, and that other types of hydraulic motors may be employed. Motor 104 may also be coupled to carrier 94 by other suitable mechanical means, such as suitable V-chain or pulley devices.

In the embodiment P of FIG. 7, a steering differential, which may be employed for track laying machines and the like, is illustrated in which the mechanical gear differential provides for straight line travel and a hydraulic arrangement for hydrostatic steering.

In the device P, suitable casing Q journals output shafts 120 and 122, which have journaled therebetween for rotation about their common axis a gear carrier R having side plates 131, 132 and annulus 133 suitably secured together and suitably journaling the respective shafts 140 and 142. Shaft 140 has keyed thereto with planet gear 137 which meshes with output sun gear 139 (keyed to shaft 120), while shaft 142 has keyed thereto planet gear 136 which meshes with sun output gear 138 (keyed to shaft 122).

Shaft 140 also has keyed to same motor gear 135 while shaft 142 has keyed to same motor gear 134, with gears 134 and 135 being in meshing relation in the same manner as pump D of FIG. 2 to form gear motor S. Operably associated with the carrier R is axial piston hydraulic device T, valve or distributor plate 18B, and reaction plate 14B, all of which are structurally substantially the same as the corresponding components of the transmission A, as indicated by corresponding reference numerals (except that cover plate 132 does not overlie cylinders 20).

Housing Q also journals input shaft 160 which has keyed thereto a bevel gear 162 meshing with ring gear 164 that forms a part of the annulus 133.

Rotation of input shaft 160 actuates hydraulic device T as a pump. When reaction plate 14 is at the zero displacement position, the gear motor S and pump T are locked up and the two shafts 120 and 122 rotate in the same direction and at the same speed. Pivoting of the reaction plate 14 from the zero displacement position causes hydraulic device T to act as a pump, and driving gear motor S, with the result that shaft 120 and 122 rotate in opposite directions relative to the direction of rotation of the carrier. Reversing the tilted position of the reaction plate reverses the direction of rotation of the shafts 120 and 122, as does reversing the direction of rotation of shaft 160.

In FIG. 8, there is illustrated a vehicle 170 which is diagrammatically illustrated as comprising front wheels 172 driven by axle 176 and rear wheels 174 driven by rear axle 177. Suitable engine 184 drives conventional transmission 185 which is connected by connecting shaft 186 to differential 188, which may be arranged in the manner shown in FIG. 6 for transmission L except that the hydraulic motor is located exteriorly of the casing M and takes the form of hydraulic motor 190 of any suitable type that is connected by hydraulic connecting lines 108 and 110 to the carrier 94 of FIG. 6.

The hydraulic motor 190 is diagrammatically illustrated as being of the axial piston type equipped with a reaction plate 192 that is adjustable in a conventional manner to vary the displacement of the hydraulic motor 190.

When the displacement of the hydraulic motor 190 is at zero, the differential is locked up and the ratio is one to one. As the displacement of the hydraulic motor 190 is increased, the ratio of the differential increases and the vehicle slows. Maximum drive from the hydraulic motor and minimum vehicle speed are at maximum hydraulic motor displacement. As the differential cannot be slowed to zero rpm, a clutch and reverse gear would be required for the vehicle 170.

It will therefore be seen that I have provided a mechanical-hydrastatic transmission device that is not only simple but effective in design, but is susceptible of a wide variety of applications.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A hydrostatic mechanical transmission comprising:
   a pair of shafts including end portions journaled in opposed coaxial relation,
   each of said shaft end portions having a sun gear member keyed thereto,
   a gear carrier member rotatably mounted for rotation about an axis that is coaxial with said shaft end portions,
   said carrier carrying a positive displacement hydraulic device comprising a pair of meshing gears journaled by said carrier member of which one of said meshing gears is coupled to one of said sun gear members and the other meshing gear is coupled to the other sun gear member, a second positive displacement hydraulic device operably connected with said carrier member, one of said devices serving as a hydraulic motor and the other of said devices serving as a hydraulic pump, and hydraulic conduit means operably connecting said pump and motor for driving said motor with hydraulic liquid pumped by said pump, one of said members serving as the input.

2. The transmission set forth in claim 1 wherein:

said hydraulic device that includes said meshing gears is the pump, and the second device is the motor, and wherein one of the sun gear members is the input.

3. The transmission set forth in claim 1 wherein:

said hydraulic device that includes said meshing gears is the motor, and wherein said carrier member is mechanically driven to serve as the input.

4. A hydrostatic mechanical transmission comprising:

a casing, a pair of shafts including end portions journaled in opposed coaxial relation in said casing, each of said shaft end portions having a sun gear keyed thereto, a gear carrier rotatably mounted in said casing for rotation about an axis that is coaxial with said shaft end portions, said carrier carrying a gear pump comprising a pair of meshing gears journaled by said carrier of which one of said meshing gears is coupled to one of said sun gears and the other meshing gear is coupled to the other sun gear, a hydraulic motor in torque transmitting relation with said carrier, and hydraulic conduit means operably connecting said pump and motor for driving said motor with hydraulic liquid pumped by said pump, one of said sun gears serving as the input gear.

5. The transmission set forth in claim 3 wherein:

said hydraulic conduit means includes hydraulic liquid flow orienting valve means that is fixed with respect to said casing and in hydraulic liquid communicating relation to said carrier.

6. The transmission set forth in claim 3 wherein:

said hydraulic motor is of the variable displacement type.

7. The transmission set forth in claim 5 wherein:

said hydraulic motor is of the axial piston type comprising:

a plurality of hydraulic piston and cylinder assemblies in circumambient relation about said carrier, and a reaction plate against which the pistons of said piston and cylinder assemblies react, said reaction plate being annular in configuration and being disposed generally crosswise of said carrier axis, said reaction plate being journaled in said casing for pivotal movement about an axis extending normally of said carrier axis for adjusting the output of the transmission.

8. The transmission set forth in claim 5 wherein:

said hydraulic motor is of the variable displacement radial piston type, and means for mechanically coupling said motor to said carrier for driving said carrier.

9. A hydrostatic mechanical transmission comprising:

a casing, a pair of shafts including end portions journaled in opposed coaxial relation in said casing, each of said shaft end portions having a sun gear keyed thereto, a gear carrier rotatably mounted in said casing for rotation about an axis that is coaxial with said shaft end portions, said carrier carrying a gear motor comprising a pair of meshing gears journaled by said carrier of which one of said meshing gears is coupled to one of said sun gears and the other meshing gear is coupled to the other sun gear, a hydraulic pump in torque transmitting relation with said carrier, and hydraulic conduit means operably connecting said pump and motor for driving said motor with hydraulic liquid pumped by said pump, said hydraulic pump being of the axial piston type comprising:

a plurality of hydraulic piston and cylinder assemblies in circumambient relation about said carrier, and a reaction plate against which the pistons of said piston and cylinder assemblies react, said reaction plate being annular in configuration and being disposed generally crosswise of said carrier axis, said reaction plate being journaled in said casing for pivotal movement about an axis extending normally of said carrier axis for adjusting the output of the transmission, and means for driving said carrier, whereby said shafts are driven shafts.

10. A hydrostatic mechanical transmission comprising:

a casing, a pair of shafts including end portions journaled in opposed coaxial relation in said casing, each of said shaft end portions having a sun gear keyed thereto, a gear carrier rotatably mounted in said casing for rotation about an axis that is coaxial with said shaft end portions, said carrier carrying a gear pump comprising a pair of meshing gears journaled by said carrier of which one of said meshing gears is coupled to one of said sun gears and the other meshing gear is coupled to the other sun gear, a hydraulic motor in torque transmitting relation with a first shaft to be driven, hydraulic conduit means operably connecting said pump and motor for driving said motor with hydraulic liquid pumped by said pump, one of said sun gears serving as the input gear, and the other sun gear being in torque transmitting relation with a second shaft to be driven.

* * * * *